United States Patent
Diez et al.

(10) Patent No.: US 9,059,794 B2
(45) Date of Patent: Jun. 16, 2015

(54) METHOD OF GENERATING INTERFERENCE SIGNALS AND DEVICE TO CARRY OUT SUCH A METHOD

(71) Applicant: Keysight Technologies, Inc., Minneapolis, MN (US)

(72) Inventors: Antonio Francisco Jurado Diez, Loveland, CO (US); Joaquin Torrecilla, Loveland, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 11 days.

(21) Appl. No.: 13/866,245

(22) Filed: Apr. 19, 2013

(65) Prior Publication Data

US 2013/0202020 A1   Aug. 8, 2013

Related U.S. Application Data

(63) Continuation-in-part of application No. PCT/ES2011/000024, filed on Feb. 9, 2011.

(51) Int. Cl.
| | | |
|---|---|---|
| *H04B 7/02* | (2006.01) | |
| *H04L 1/02* | (2006.01) | |
| *H04B 17/00* | (2015.01) | |
| *H04B 17/345* | (2015.01) | |

(52) U.S. Cl.
CPC .......... *H04B 17/0085* (2013.01); *H04B 17/345* (2015.01)

(58) Field of Classification Search
USPC ........................................................ 375/267
See application file for complete search history.

(56) References Cited

U.S. PATENT DOCUMENTS

| | | |
|---|---|---|
| 5,675,581 A | 10/1997 | Soliman |
| 6,813,477 B1 | 11/2004 | Harris et al. |
| 2008/0159442 A1* | 7/2008 | Tanabe et al. .................. 375/324 |

FOREIGN PATENT DOCUMENTS

| | | |
|---|---|---|
| CN | 1130450 | 9/1996 |
| CN | 101349740 | 1/2009 |
| CN | 101719996 | 6/2010 |
| EP | 1768284 A1 | 3/2007 |

OTHER PUBLICATIONS

International Preliminary Report on Patentability mailed Aug. 22, 2013 in International Application No. PCT/ES2011/000024.

(Continued)

*Primary Examiner* — Tanmay Shah

(57) ABSTRACT

A method for generating interference signals and a device to carry out said method, in which an interference signal (1) is added in a signal combination and separation network (3) with a desired signal (4) that carries a test message, the sum signal being sent to a device being tested (5). The interference signal (1) is generated with a single source connected to a signal divider and conditioner block (7) that attenuates additional interference produced by the source of generation of interference signals (1), while providing as many interference signals (1) as the device (5) under test has antennas (Rx, Rx/Tx), and in which each interference signal (1) is sent to a respective amplification and isolation block (8), which adjusts the power level of the interference signal (1) and attenuates the reverse intermodulation products produced by the transmission of signals by the device (5) under test.

10 Claims, 5 Drawing Sheets

(56) References Cited

OTHER PUBLICATIONS

International Search Report for International Application No. PCT/ES2011/000024.

Office Action mailed Sep. 9, 2014 in Chinese Application No. 201180069935.X.

Abbosh, et al. "Design of Compact Directional Couplers for UWB Applications", IEEE Transactions on Microwave Theory and Techniques, vol. 55, No. 2, Feb. 2007.

Moscoso-Martir, et al. "Six-port Junction with Complete UWB Band Coverage in Multilayer Technology", Proceedings of the 41st European Microwave Conference, Oct. 2011.

Moscoso-Martir, et al. "Slot-Coupled Multisection Quadrature Hybrid for UWB Applications", IEEE Microwave and Wireless Components Letters, vol. 19, No. 3, Mar. 2009.

* cited by examiner

METHOD OF GENERATING INTERFERENCE SIGNALS AND DEVICE TO CARRY OUT SUCH A METHOD

CROSS-REFERENCE TO RELATED APPLICATIONS

The present application is a continuation application of International Patent Application PCT/ES2011/000024 filed on Feb. 9, 2011. Priority under 35 U.S.C. §120 is claimed from International Patent Application PCT/ES2011/000024, and the entire disclosure of International Patent Application PCT/ES2011/000024 is specifically incorporated herein by reference.

TECHNICAL FIELD

The present teachings relates to the field of wireless communications, specifically, the performing of tests to measure the signal reception quality of radio frequency signal transmitters and receivers in which the device being tested receives radio frequency signals in the presence of interference signals. In this regard, a system for generating interference signals is proposed that can be used in transmitters and receivers with multiple inputs and multiple outputs (MIMO).

The method for measuring, in the presence of interference, the signal reception quality in a signal transmitter and receiver device consists in the generating of at least two signals, a desired signal that carries a test message and an interference signal. The two signals are added, for example, in a signal combination and separation network, and transmitted to the signal transmitter and receiver device being tested, known as the EUT ("equipment under test"). This device makes an estimation of the message contained in the sum signal that it has received and retransmits the estimated message to a processor, which compares the message estimated by the device under test, thus being able to determine different signal reception quality parameters, such as the bit error rate (BER) or the packet error rate (PER).

Among the signal reception quality tests, special difficulty is presented by those in which the interference signal is a continuous wave signal situated in frequencies which exclude the reception bands of the signal transmitter/receiver device under test. This is due to the fact that the power of the interference signal is very large as compared to the power of the desired signal which is close to the level of sensitivity of the device under test. In such conditions, additional interference may appear in the reception band of the device under test, degrading the signal reception quality and altering the test result. This additional unwanted interference can be wideband noise, harmonics, subharmonics and spurious caused by the source of generating the interference signals, or products of intermodulation in reverse, generated in the system itself by the signal retransmitted by the device under test.

A common solution for this problem is to place a filter bank at the output of the source of generation of the interference signal. The filter bank is made up of a band-stop filter and a high-pass filter. The band-stop filter is selected when it low-pass cutoff frequency is greater than the center frequency of the interference signal, and the high-pass filter eliminates the interference in the reception band of the device under test when the center frequency of the interference signal is greater than the low-pass cutoff frequency of the band-stop filter.

Even though this solution can attenuate the interference appearing in the reception band of the device, it has numerous drawbacks when it is necessary to perform tests in different reception bands, since:

One needs a band-stop filter for each service band supported by the system. These filters are costly and bulky, since they are of high order and employ resonant cavity technology.

The filter bank requires an additional switched array to select the reception band in which the test is to be performed. The complexity and the cost of this switched array increase significantly with the number of bands supported.

Whenever a test needs to be performed in a different reception band it is necessary to calibrate the response of the entire system, from the source generating the continuous wave interference signal to the device under test.

It is not easy to update the system to work in new reception bands.

On the other hand, the radio frequency signal transmitter and receiver devices that are compatible with the most recent wireless communication standards, such as the WiMAX (Worldwide Interoperability for Microwave Access) standard and the LTE (Long Term Evolution) standard, have more than one receiving antenna in order to support functionalities such as reception diversity or MIMO (Multiple Input Multiple Output) characteristics. This increases the problems, since the number of interference signals needed to test such devices is multiplied.

The current solutions for multiple input and multiple output devices with reception diversity are aimed at providing a power divider at the output of the filter bank to divide the interference signal to the different receiving antennas of the device under test.

This solution presents problems in tests where the interference signal is located outside the reception bands of the device. In this type of test, the frequency range is very broad (on the order of 1 MHz to dozens of GHz), which means that the implementation of the power divider needs to be resistive, so that the necessary isolation does not exist to prevent the signal transmitted by the device under test from interfering with the signal received.

One solution to accomplish such an isolation lies in inserting attenuators between the power divider and the device under test. However, this entails very harsh power specifications for the source of generation of interference signals. Furthermore, the losses undergone by the desired signal and the interference signal from the input of the power divider to each one of the receiver antennas of the device under test are not the same. This is due to imperfections of components, manufacturing tolerances, and different lengths of the interconnection cables, so that it is difficult to satisfy the strict uncertainty requirements for the power transmitted to the device under test.

To overcome these problems, one solution is known that is based on replicating the sources of generation of interference signals and the filter banks. In this way, one achieves a good isolation between the signals transmitted to the device under test, and adjusts the level at each point of reception in a totally independent way. The drawback of this solution is the substantial increased cost of the system, which is further increased when equipment is involved that covers several reception bands.

It is therefore necessary to provide a system for generating interference signals for application in radio frequency signal transmitter and receiver devices with multiple inputs and multiple outputs that is able to solve the aforementioned problems in a simple, economical and effective manner.

SUMMARY

According to the present teachings, a system is proposed for generating interference signals of the kind used to measure the signal reception quality of wireless transmitter and receiver devices, which may consist of Multiple Inputs and Multiple Outputs (MIMO). The system achieves a good isolation between the interference signals, minimizes the reverse intermodulation products, and has a low cost as compared to the conventional solutions.

The system for generating interference signals of the present teachings is comprised of a single source of generation of interference signals, connected to a signal divider and conditioner block, obtaining at its output as many interference signals as the device under test has antennas. Each interference signal provided by the signal divider and conditioner block is sent to a respective amplification and isolation block, such that the interference signals so obtained are added in respective signal combination and separation networks with the desired signals that carry test messages. The sum signals obtained are transmitted to the corresponding antenna of the device being tested. Thus, the signal divider and conditioner block eliminates the additional interference caused by the source of generation of interference signals and the amplification and isolation blocks attenuate the reverse intermodulation products originating when the device under test performs a transmission.

The signal divider and conditioner block is formed by a first switch that connects to at least one filter that performs the functions of attenuation of the additional interference produced by the source of generation of interference signals, in turn connecting this filter to a second switch, at the output of which is arranged a power divider to divide the interference signal into as many signals as there are reception antennas in the device under test.

According to one preferred embodiment, the filter of the signal divider and conditioner block that attenuates the additional interference produced by the source of generation of interference signals is a tunable band-pass filter that covers the reception bands of the device under test.

According to another embodiment, the filter of the signal divider and conditioner block that attenuates the additional interference caused by the source of generation of interference signals is a band-pass filter bank with distinct tuning frequency ranges, so as to cover even more broad frequency intervals.

At the output of the tunable band-pass filter or at the output of each filter of the bank there is provided a low-noise amplifier to compensate for the attenuation caused by the filters themselves.

The amplification and isolation block is comprised of a variable gain amplifier, which minimizes the level of the reverse intermodulation products that are produced when the device under test performs a transmission. At the output of the variable gain amplifier is connected, in phase-locked loop, a power detector followed by an automatic gain control block for said amplifier. Likewise, the output of the variable gain amplifier is connected to a filter bank, followed by an attenuator, which is used so that the operating point of the variable gain amplifier is optimal with respect to reverse intermodulation.

Said filter bank is comprised of high-pass filters and low-pass filters, which are used to eliminate the harmonics created by the low-noise amplifier of the signal divider and conditioner block and the variable gain amplifier of the amplification and isolation block.

The variable gain amplifier of the amplification and isolation block must have a high rejection of reverse intermodulation products. For this, according to one sample embodiment, said block is composed of a variable attenuator, a high-power amplifier and a second attenuator, so that the high-power amplifier operates in a range where the level of the reverse intermodulation products is very reduced. According to another sample embodiment, said variable gain amplifier has a square wave converter at its input, in front of the variable attenuator, to improve the rejection of reverse intermodulation products.

One thus obtains a system that is preferable in its design and functional characteristics for the intended application of generating interference signals, solving in a simple, effective, and low-cost manner the problems relating to the appearance of additional unwanted interference, as wideband noise, harmonics, subharmonics and spurious, produced by the source of generation of interference signals, as well as the problems resulting from the appearance of reverse intermodulation products which degrade the reception quality of the device being tested.

BRIEF DESCRIPTION OF THE DRAWINGS

The described embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

Figure 1:
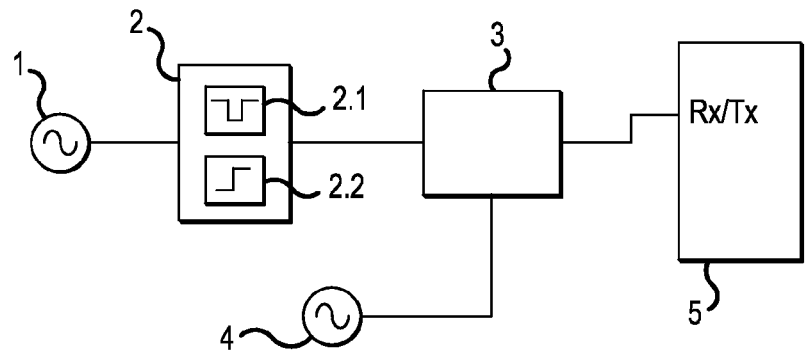
FIG. 1 shows a conventional system for generating interference signals for a signal receiver device being tested.

FIG. 1 shows a conventional system for generating interference signals for a signal receiver device being tested, in which said system if formed by a source of generation of an interference signal (1) that is conditioned by a bank of filters (2) to be added in a signal combination and separation network (3), along with a desired signal (4) that carries a test message, coming from a source of generation of said desired signal (4), so that the signal resulting from the adding is sent to the device (5) under test, which makes an estimation of the message contained in the sum signal that has been received and retransmits it to a processor (not shown), which compares the test message transmitted initially with the message estimated by the device (5) under test, thus being able to determine different signal reception quality parameters.

The bank of filters (2) is composed of a band-stop filter (2.1), which is selected when its low-pass cutoff frequency is greater than the center frequency of the interference signal (1), and a high-pass filter (2.2), which eliminates the unwanted interference in the reception band of the device (5) under test when the center frequency of the interference signal (1) is greater than the low-pass cutoff frequency of the band-stop filter (2.1).

This solution provided by the bank of filters (2) can attenuate the interference which may occur in the reception band of the device (5) that is caused by the source of generation of interference signals (1); even so, it has numerous drawbacks when it is necessary to perform tests in different reception bands of the device (5).

Figure 2:
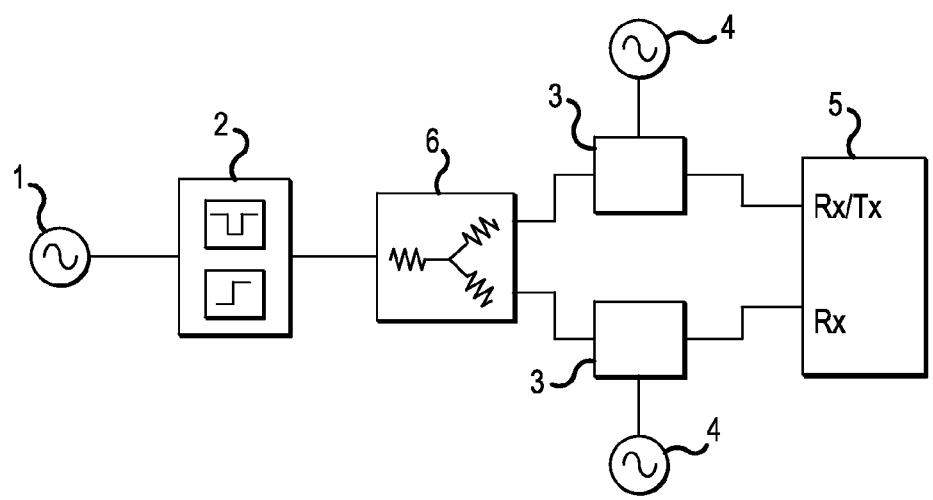
FIG. 2 shows another conventional system for generating interference signals for a transmitter/receiver device with multiple inputs and multiple outputs.

FIG. 2 shows another conventional system for generating interference signals for a transmitter/receiver device with multiple inputs and multiple outputs, which is formed by a source of generation of an interference signal (1), which is conditioned by a bank of filters (2), at whose output is placed a power divider (6) that divides the interference signal as many times as there are reception antennas (Rx) in the device (5) under test.

This FIG. 2 shows the more simple case of a device (5) with two antennas, one antenna (Rx) for the reception of signals and another antenna (Rx/Tx) for the reception and transmission of signals. In this type of device and for tests in which the interference signal (1) is located outside the reception bands of the device (5), the frequency range is very broad (on the order of 1 MHz to dozens of GHz), which necessitates a resistive design of the power divider (6), so that the necessary isolation is lacking to prevent the signal transmitted via the antenna (Rx/Tx) of the device (5) under test from interfering with the signal received via the antenna (Rx).

To achieve the required isolation, one needs to place attenuators between the power divider (6) and the device (5) under test, which necessitates very demanding power specifications for the source of generation of interference signals (1). Furthermore, the losses undergone by the desired signal (4) and the interference signal (1) from the input of the power divider (6) to each of the receiver antennas (Rx) of the device (5) under test are not the same. To prevent this, the system components need to have minimal levels of manufacturing tolerance, which substantially increases the cost of the equipment (one needs practically identical wiring and componentry).

Figure 3:
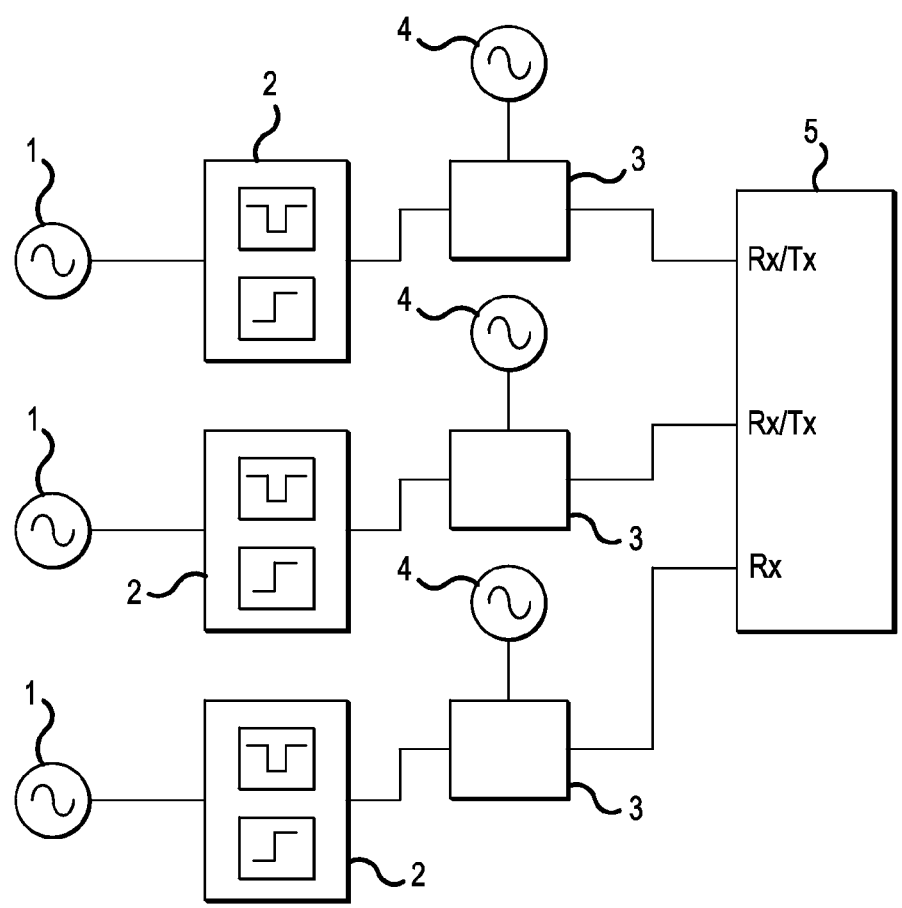
FIG. 3 shows another conventional system for generating interference signals for use in transmitter/receiver devices with multiple inputs and multiple outputs.

FIG. 3 shows another system for generating interference signals related to the prior art, for use in transmitter/receiver devices with multiple inputs and multiple outputs. This system is based on replicating the system for generating interference signals of FIG. 1 according to the number of receiving antennas (Rx) in the device (5) under test. This means providing one system for generating interference signals (1) and one bank of filters (2) for each antenna (Rx). These interference signals (1) are added with desired signals (4) in distinct signal combination and separation networks (3). This solution solves the problem of the additional interference caused by the source of generation of interference signals (1) and the problem of isolation between the antennas of the device (5) under test. Moreover, the signal level in each antenna of the device (5) under test can be adjusted independently. Even so, the need to replicate the entire system makes this solution economically unviable.

Figure 4:
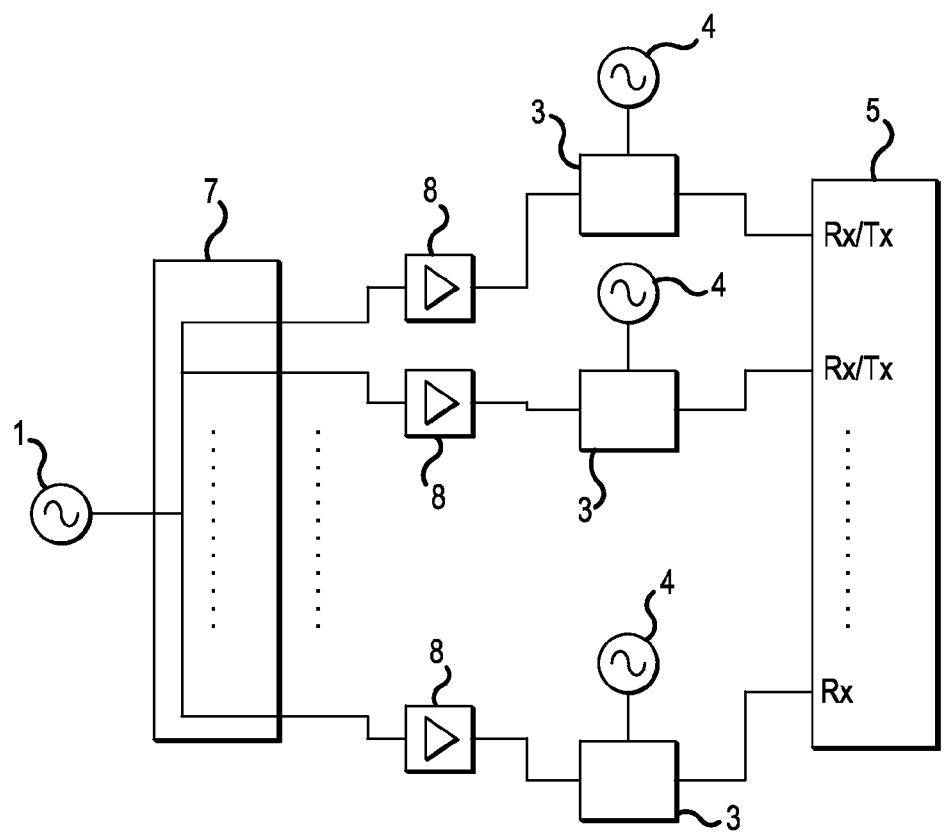
FIG. 4 shows a system for generating interference signals according to the present teachings, formed by a single source of generation of an interference signal, a signal divider and conditioner block, and a signal amplification and isolation block.

FIG. 4 shows the system for generating interference signals according to the present teachings, formed by a single source of generation of an interference signal (1), connected to a signal divider and conditioner block (7) which eliminates additional interference caused by the source of generation of interference signals (1) and produces at its output as many interference signals (1) as there are antennas (Rx, Rx/Tx) for the device (5) under test, and in which each interference signal (1) produced in the signal divider and conditioner block (7) is sent to a respective amplification and isolation block (8), which adjusts the power level of the interference signal (1) and attenuates reverse intermodulation products caused by the transmission of the device (5) under test. The interference signals (1) are added in respective signal combination and separation networks (3) together with desired signals (4), and the resulting sum signals are sent to their respective antenna (Rx or Tx/Rx) of the device (5) under test. The device (5) under test finally retransmits the signal received to a processor (not shown), where the parameters are calculated that measure the signal reception quality.

Figure 5:
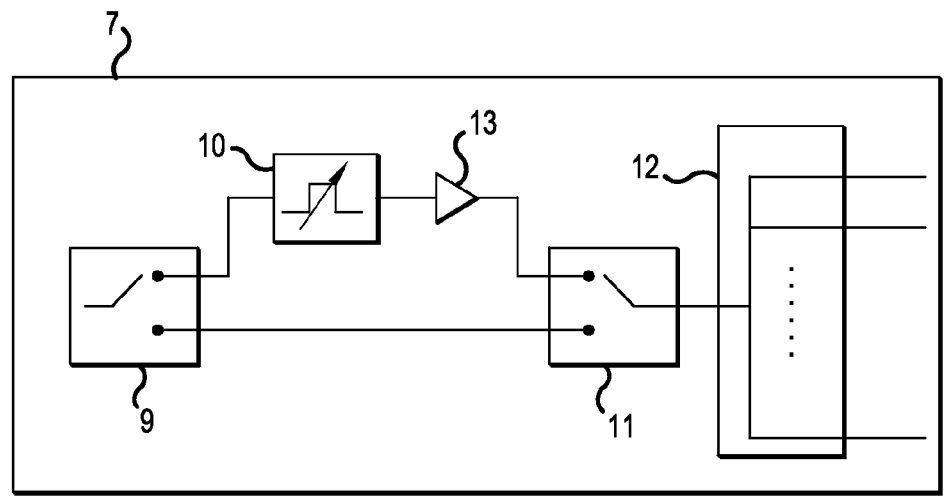
FIG. 5 shows a sample embodiment of the signal divider and conditioner block of FIG. 4.

FIG. 5 shows a sample embodiment of the signal divider and conditioner block (7), which is composed of a first two-way switch (9), a tunable band-pass filter (10), a second two-way switch (11) and a power divider (12). The first two-way switch (9) is located at the input of the signal divider block and conditioner block (7), and between the first two pathways of the first and second two-way switches (9, 11) is connected the tunable band-pass filter (10). This tunable band-pass filter (10) is preferably a tunable band-pass filter which covers at least the totality of reception bands of the communication standards needing to be supported and therefore of the device (5) under test.

Thus, the first and second two-way switches (9, 11) select the tunable band-pass filter (10) when the frequency of the interference signal (1) is within the range of frequencies of the communication standards that need to be supported and when the frequency of the interference signal is outside of this range the second pathways of the first and second two-way switches (9, 11) are short-circuited.

For example, if one needs to ensure compatibility with different standards whose reception bands are situated in a minimum receiving frequency of 700 MHz (fRx,min=700 MHz) and a maximum receiving frequency of 3 GHz (fRx,max=3 GHz), the minimum operating frequency of the tunable band-pass filter (10) should be less than 700 MHz (fmin<700 MHz), and the maximum frequency greater than 3 GHz (fmax>3 GHz). In order for the tunable band-pass filter (10) to be selected when the frequency of the interference signal (1) is comprised between the minimum frequency and the maximum frequency of reception of the device (5) under test (fRx,min<f<fRx,max), while when the frequency of the interference signal (1) is outside this range the source of generation of the interference signal (1) connects directly to the power divider (12).

As is shown in the sample embodiment of FIG. 5, it is possible to place a low-noise amplifier (13) at the output of the tunable band-pass filter (10), in order to compensate for the attenuation caused by the filtering process.

Figure 6:
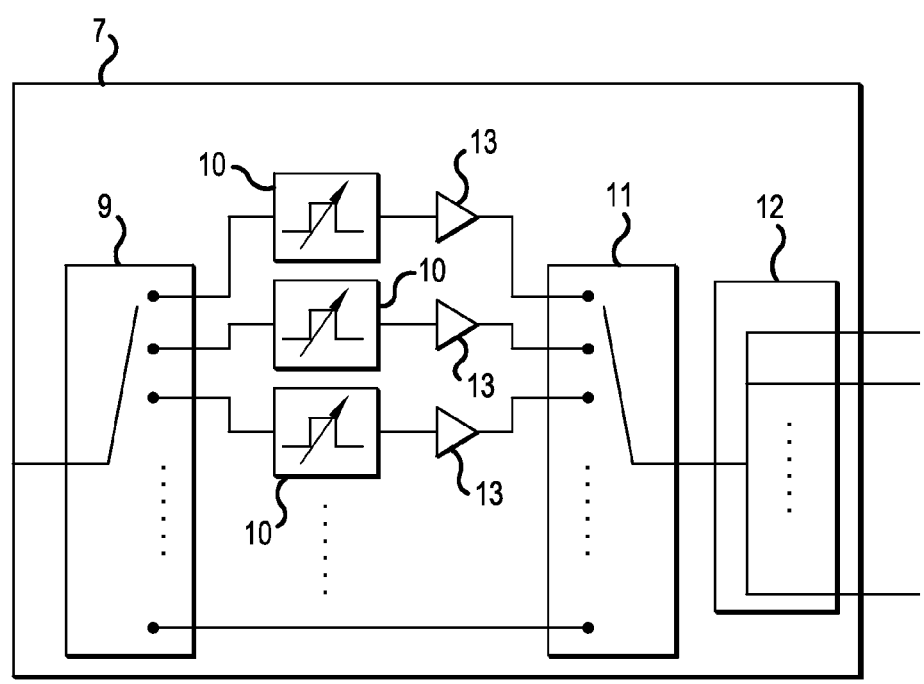
FIG. 6 shows another embodiment of the signal divider and conditioner block of FIG. 4.

If the tunable band-pass filter (10) is made in the YIG (yttrium iron garnet) technology, whose tuning frequency range goes from 500 MHz to 4 GHz, with only a single filter one could cover all the cellular standards, Bluetooth and the WiMAX bands situated below 4 GHz. In order to operate in even broader frequency bands, the first and second two-way switches (9, 11) can have several pathways for switching to a bank of tunable band-pass filters (10), as shown in FIG. 6.

Figure 7:
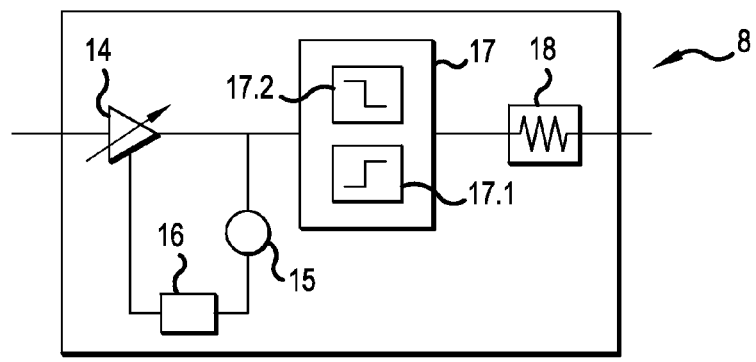
FIG. 7 shows a sample embodiment of the signal amplification and isolation block of FIG. 4.

FIG. 7 shows a sample embodiment of one of the amplification and isolation blocks (8) of the system for generating interference signals according to the teachings, being composed of a variable gain amplifier (14) which produces a very low level of reverse intermodulation and whose output is connected in a phase-lock loop to a power detector (15), followed by an automatic gain control unit (16) of the variable gain amplifier (14), there likewise being connected to the output of the variable gain amplifier (14) a filter bank (17), followed by an attenuator (18).

The amplification and isolation block (8) adjusts the power of the interference signal to reach the specified power level at the input of the device (5) under test. For this, the power detector (15) performs a continuous measuring of the power at the output of the variable gain amplifier (14) and the automatic gain control unit (16) regulates the gain of the variable gain amplifier (14) as a function of the desired power level in the device (5) and the measurements provided by the power detector (15). The attenuator (18) is used so that the operating point of the variable gain amplifier (14) is optimal.

The filter bank (17) of the amplification and isolation block (8) is comprised of high-pass filters (17.1) and low-pass filters (17.2) (of reduced cost and size), which eliminate the harmonics that may appear in the system. Depending on the frequency of the interference signal in the filter bank (17), an appropriate low-pass filter (17.2) is selected to eliminate the harmonics created by the low-noise amplifier (13) and the variable gain amplifier (14).

When the frequency of the interference signal (1) is less than the minimum receiving frequency of the device (5) (fcw<fRx,min), a low-pass filter (17.2) is configured in the filter bank (17) to attenuate the energy content of the interference signal (1) that may appear inside the reception band of the device (5) under test. For frequencies of the interference signal (1) that are greater than the maximum reception frequency (fcw>fRx,max), a single high-pass filter (17.1) is activated to perform this same task. Thus, it is not necessary for the tunable band-pass filter (10) to go through the entire range of frequencies of the interference signal (1).

When the device under test transmits a signal, the latter arrives at the output of the variable gain amplifier (14). Due to the nonlinear behavior of this variable gain amplifier (14), two reverse intermodulation products are produced, which can degrade the receiving quality of the device (5). These reverse intermodulation products obey the following equations:

$$f1 = 2 \cdot fcw - fTx; \quad f2 = 2 \cdot fTx - fcw;$$

where f1 and f2 are the respective frequencies of the reverse intermodulation products, fcw is the frequency of the interference signal (1) and fTx is the frequency of the signal transmitted by the device (5).

In order not to affect the tests for measurement of the signal reception quality, the variable gain amplifier (14) is designed to achieve a very low level of noise and reverse intermodulation products as compared to the power of the desired signal (4).

Figure 8:
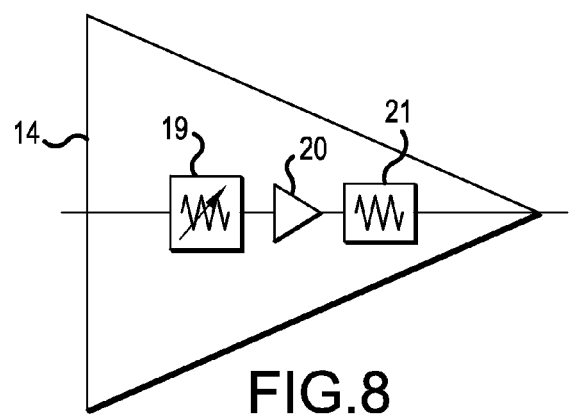
FIG. 8 shows a sample embodiment of a variable gain amplifier of the signal amplification and isolation block.

FIG. 8 shows a sample embodiment of the variable gain amplifier (14), which is formed by a variable attenuator (19), a high-power amplifier (20) and a second attenuator (21). It should be pointed out that the high-power amplifier (20) is situated after the variable attenuator (19) in order to take advantage of the greater linearity of the latter.

In order for the variable gain amplifier (14) to have a good rejection of the reverse intermodulation products at frequencies f1 and f2, one needs to take the following into account:

On the one hand, the reverse intermodulation product at frequency f2 is attenuated by 2 dB each time that the attenuation Lk of the second attenuator (21) rises by one dB. The explanation for this phenomenon is that the power $P_2$ of the reverse intermodulation product at frequency f2 depends on the following relation:

$$P_2 = Pcw \text{ (dBm)} + 2 \cdot Peut \text{ (dBm)} - Lk) \text{dB})$$

where Pcw and Peut are the powers at the output of the amplifier of the interference signal (1) and the device (5) under test, respectively, and Lk is the attenuation of the second attenuator (21).

According to this relation, when the attenuation Lk is increased by 1 dB, the power Pcw of the interference signal grows by 1 dB and the power Peut of the device (5) is reduced by 1 dB. Therefore, to attenuate the reverse intermodulation product at frequency f2, the attenuation Lk of the second attenuator (21) is increased.

On the other hand, the theory of a third-order nonlinear system predicts that the power $P_1$ of the reverse intermodulation product at frequency f1 is independent of the attenuation Lk.

The behavior of the reverse intermodulation product at frequency f1 depends on the following relation:

$$P_1 = 2 \cdot Pcw \text{ (dBm)} + Peut \text{ (dBm)} - Lk \text{ (dB)}$$

where Pcw and Peut are the powers of the interference signal (1) and the device (5) under test, respectively, and Lk is the attenuation of the second attenuator (21).

Even so, in a real situation, the model of the high-power amplifier (20) is adjusted to a polynomial of degree higher than three. As a result, there is no linear relation between the level of the reverse intermodulation product at frequency f1 and the power parameters of the interference signal (1), the power of the device (5), and the attenuation Lk of the second attenuator (21). This circumstance is exploited to minimize the intermodulation products in power amplifiers operating in large signal conditions. The solution consists in setting the operating point of the high-power amplifier (20) by means of the second attenuator (21) at an output power where the intermodulation products of third order cancel out.

In summary, it is possible to increase the attenuation Lk of the second attenuator (21) to minimize the level of the reverse intermodulation products which appear in the antennas of the device (5) under test as a consequence of the nonlinear behavior of the high-power amplifier (20). This further allows one to attenuate the noise introduced by the amplifiers of the proposed system.

Figure 9:
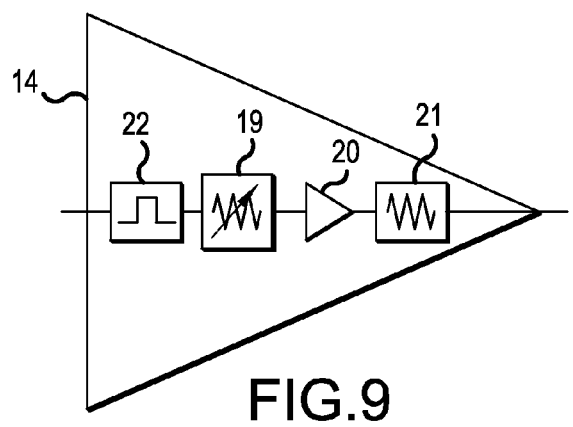
FIG. 9 shows another sample embodiment of the variable gain amplifier of the signal amplification and isolation block.

FIG. 9 shows another sample embodiment of the variable gain amplifier (14), where a square wave converter (22) is provided at the input of the amplification and isolation block (8) in front of the variable attenuator (19). In the previous examples, it was assumed that the interference signal (1) is a continuous wave signal, and to achieve an even better rejection of reverse intermodulation products it is possible to convert this continuous wave signal into a square wave signal by means of said square wave converter (22), which is a limiting amplifier that operates in saturation.

The foundation of this solution is based on the reverse intermodulation product at frequency f1 being more powerful than those produced by the variable gain amplifier (14). Therefore, one should attenuate it as much as possible. The explanation of the origin of this intermodulation product is found in the polynomial which characterizes the nonlinear behavior of the high-power amplifier (20), where a third-order product arises of the form:

$$Scw^2(t) \cdot STx(t)$$

where Scw is the interference signal (1) of continuous wave and STx the signal transmitted by the device (5).

The term $Scw^2$ is what causes the appearance of components at frequencies 2·fcw−fTx. Therefore, by using a square wave instead of the continuous wave signal, components at a frequency of 2·fcw−fTx cannot appear, because the square wave ideally does not have harmonics of even order.

While representative embodiments are disclosed herein, one of ordinary skill in the art will appreciate that many variations that are in accordance with the present teachings are possible and remain within the scope of the appended claims. The invention therefore is not to be restricted except within the scope of the appended claims.

The invention claimed is:

1. A method for generating interference signals used to generate an interference signal that is added in a signal combination and separation network with a desired signal that carries a test message, the sum signal being sent to a device being tested, provided with multiple signal reception and transmission/reception antennas, the method comprising:
   generating the interference signal by a single source of generation of interference signals, wherein the interference signal is connected to a signal divider and conditioner block that attenuates additional interference produced by the source of generation of interference signals, the signal divider and conditioner block providing at an output as many interference signals as the device under test has antennas;
   sending each interference signal obtained in the signal divider and conditioner block is to a respective amplification and isolation block, the amplification and isolation block adjusting a power level of the corresponding interference signal and attenuating the reverse intermodulation products produced by the transmission of signals by the device under test;
   directing the interference signals to respective networks; and
   adding the interference signals with the desired signal.

2. A device configured to generate the interference signal that is added in a network with the desired signal that carries a test message, to send the sum signal to a device being tested, provided with multiple signal reception and transmission/reception antennas, the device comprising:
   a source of generation configured to generate interference signals;
   a signal divider and conditioner block connected to the source, wherein the signal divider and conditioner block has as many outputs of interference signals as the device has antennas; and
   a respective amplification and isolation block of each interference signal being connected to each output of said signal divider and conditioner block, the amplification and isolation block comprising a variable gain amplifier, the output of the variable gain amplifier being in phase-locked loop, to a power detector followed by an automatic gain control block for the amplifier.

3. The device in accordance with claim 2, wherein the signal divider and conditioner block comprises a first switch that connects to at least one filter and which in turn connects to a second switch, the output of the second switch being connected to a power divider that distributes the interference signal among the antennas of the device under test.

4. The device in accordance with claim 1, wherein the output of the amplifier is connected to a filter bank followed by an attenuator (18).

5. The device in accordance with the claim 3, wherein the filter is a tunable band-pass filter that covers the reception bands of the device under test.

6. The device in accordance with the claim 3, wherein the filter comprises a bank of tunable band-pass filters.

7. The device in accordance with the claim 3, further comprising, at the output of the filter of the signal divider and conditioner block, a low-noise amplifier configured to compensate for the attenuation caused by the filter.

8. The device in accordance with the claim 3, wherein the filter bank of the amplification and isolation block comprises high-pass filters and low-pass filters.

9. The device in accordance with the claim 1, wherein the variable gain amplifier of the amplification and isolation block comprises a variable attenuator a high-power amplifier and a second attenuator, the second attenuator configured to adjust an operating point of the high-power amplifier to minimize a level of reverse intermodulation products and to attenuate the noise introduced by the amplifiers of the system.

10. The device in accordance with the claim 9, wherein the variable gain amplifier comprises a square wave converter at its input, in front of the variable attenuator, to attenuate reverse intermodulation products.

\* \* \* \* \*